(12) United States Patent
Park et al.

(10) Patent No.: US 7,248,764 B2
(45) Date of Patent: Jul. 24, 2007

(54) LIGHT GUIDE PLATE, BACKLIGHT UNIT, LIQUID CRYSTAL DISPLAY AND METHOD OF MANUFACTURING THE LIGHT GUIDE PLATE

(75) Inventors: Hye-eun Park, Suwon-si (KR); Je-wan Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 10/934,480

(22) Filed: Sep. 7, 2004

(65) Prior Publication Data

US 2005/0175283 A1 Aug. 11, 2005

(30) Foreign Application Priority Data

Feb. 6, 2004 (KR) .................... 10-2004-0008006

(51) Int. Cl.
 *G02B 6/34* (2006.01)
 *G02B 1/10* (2006.01)
 *G02F 1/1333* (2006.01)
 *B29D 11/00* (2006.01)

(52) U.S. Cl. ............................ 385/36; 385/14; 385/31; 385/129; 385/130; 385/131; 385/146; 385/900; 264/1.1; 264/1.24; 349/63; 349/65; 349/56; 349/57; 359/237; 359/580

(58) Field of Classification Search ................. 385/14, 385/129, 130, 131, 146, 36, 31, 900, 901; 349/62, 63, 65, 57, 56; 264/1.1, 1.24, 1.34, 264/2.1, 2.3; 359/237, 580

See application file for complete search history.

(56) References Cited

U.S. PATENT DOCUMENTS 5,446,567 A * 8/1995 Haim et al. .................... 349/62

(Continued)

FOREIGN PATENT DOCUMENTS

JP 11-119219 4/1999

(Continued)

*Primary Examiner*—Brian M. Healy
(74) *Attorney, Agent, or Firm*—Stanzione & Kim, LLP (57) ABSTRACT

A light guide plate that eliminates haze while obtaining a desired uniformity of luminance to enhance light efficiency. The light guide plate can be used with a backlight unit using the light guide plate and an LCD using the backlight unit. The light guide plate includes an incidence face to allow light emitted from a light source to be incident to the light guide plate, an outgoing face to allow the incident light to exit the light guide plate, a backside face opposite to the outgoing face, and mirror patterns provided at the outgoing face or backside face, and adapted to increase an exiting rate of the light at a low luminance region defined in a vicinity of the light source. The light guide plate is manufactured by a method including a mold machining operation including a prism face milling operation to form, at a mold, a prism face corresponding to a prism face of the light guide plate, and a mirror pattern milling operation to mill the prism face formed at the prism face milling operation using a bit having a predetermined cross-sectional shape, thereby forming mirror patterns at the prism face, and a light guide plate injection-molding operation to mill a molten resin into the mold completely machined at the mold machining operation, thereby injection-molding the light guide plate.

31 Claims, 6 Drawing Sheets

U.S. PATENT DOCUMENTS

| | | | |
|---|---|---|---|
| 5,467,208 A | * | 11/1995 | Kokawa et al. ............... 349/67 |
| 6,522,373 B1 | * | 2/2003 | Hira et al. .................. 362/603 |
| 6,554,451 B1 | * | 4/2003 | Keuper ....................... 362/237 |
| 6,612,722 B2 | * | 9/2003 | Ryu et al. ................... 362/331 |
| 6,625,379 B1 | * | 9/2003 | Azuma ....................... 385/146 |
| 6,898,012 B2 | * | 5/2005 | Kaminsky et al. .......... 359/599 |
| 2005/0175283 A1 | * | 8/2005 | Park et al. .................... 385/36 |

FOREIGN PATENT DOCUMENTS

JP     2001-083507     3/2001

\* cited by examiner

LIGHT GUIDE PLATE, BACKLIGHT UNIT, LIQUID CRYSTAL DISPLAY AND METHOD OF MANUFACTURING THE LIGHT GUIDE PLATE

CROSS-REFERENCE TO RELATED APPLICATION

This application claims the benefit of Korean Patent Application No. 2004-8006, filed on Feb. 6, 2004 in the Korean Intellectual Property Office, the disclosure of which is incorporated herein by reference.

BACKGROUND OF THE INVENTION

1. Field of the Invention

The general inventive concept relates to a light guide plate, a backlight unit, a liquid crystal display (LCD), and a method of manufacturing the light guide plate, and more particularly, to a light guide plate capable of achieving an enhancement in light efficiency while ensuring a desired uniformity of luminance of a backlight unit used in an LCD, and a method of manufacturing the light guide plate.

2. Description of the Related Art

LCDs, which are widely used in notebook computers and monitors, require a separate illumination device because they employ elements having no function of emitting light by themselves, as compared to cathode ray tubes (CRTs). Illumination devices for LCDs are classified into a reflection type, a transmission type, and a combination type thereof in accordance with operating systems thereof. The transmission type illumination device, which is most widely used, is also called a "backlight unit" since it irradiates illumination light onto the backside of a liquid crystal panel.

Among various types of backlight units, a sidelight type is widely used. The reason why this type of backlight unit is called a "sidelight type" is that a light source for emitting illumination light is arranged at one side of a light guide plate adapted to propagate the illumination light therethrough. Such a backlight unit includes a light source, a light guide plate for directing the light emitted from the light source toward a liquid crystal panel, a prism sheet for correcting the directionality of the light going out of the light guide plate, thereby directing the outgoing light to a front side of the liquid crystal panel, and a diffusion sheet for relaxing the directionality of the light outgoing from the prism sheet.

The light guide plate generally has a tapered plate structure having a thickness gradually reduced as it extends away from the light source. The light guide plate has an incidence face provided by one of the minor faces thereof facing the light source, and an outgoing face provided by one of the major faces thereof and adapted to allow light propagated through the light guide plate to exit the light guide plate. The other major face is referred to as an "opposite face or backside face," and is opposite to the outgoing face.

The illumination light exiting the outgoing face of the light guide plate exhibits a non-uniform distribution of light amount over the outgoing face because the amount of light thereof in the vicinity of the light source is relatively small. As a result, the outgoing face of the light guide plate has a region exhibiting a relatively low luminance as compared to other regions. This is because the light exiting the outgoing face of the light guide plate has a large amount of components having an exiting angle larger than a critical total-reflection angle at a region of the outgoing face in the vicinity of the light source, so that these light components are totally reflected, thus being re-propagated into the light guide plate without exiting the outgoing face.

In order to eliminate such a low luminance region, thereby ensuring a desired luminance uniformity, various methods have been proposed. For example, Japanese Patent Laid-open Publication No. 11-119219 discloses a method in which a light scattering pattern is provided at a low luminance region of an outgoing face by locally roughening the low luminance region. Also, Japanese Patent Laid-open Publication No. 2001-083507 discloses a method in which the entire portion of an outgoing face is roughened such that the roughness at a low luminance region of the outgoing face is larger than that of other regions. For the manufacture of such a roughened light guide plate, an injection mold partially processed by a blasting or etching method may be used.

In accordance with the above mentioned conventional methods, the mean inclination of a light guide plate at an outgoing face or backside face thereof is increased to cause illumination light exiting the outgoing face to have an increased amount of components having an exiting angle smaller than a critical total-reflection angle, thereby achieving an increase in the exiting rate of the illumination light.

In the case of a light guide plate roughened at an outgoing face or backside face thereof, as described above, however, scattering of the exiting light may occur. As a result, there may be an increase in the loss of light caused by haze. Furthermore, where such a roughened face is formed using an etching process, its shape is irregular, so that it is impossible to implement a desired mean inclination at all regions of the roughened face. For this reason, there is a problem in that luminance defects may be easily generated. In addition, there is a difficulty in accurately reproducing the roughened face.

SUMMARY OF THE INVENTION

The present general inventive concept has been made in view of the above mentioned problems, and an aspect of the general inventive concept is to provide a light guide plate capable of eliminating haze caused by roughing of a desired face thereof while obtaining a desired uniformity of luminance, thereby achieving an enhancement in light efficiency, a backlight unit using the light guide plate, and an LCD using the backlight unit.

Another aspect of the general inventive concept is to provide a method of manufacturing a light guide plate capable of implementing a desired mean inclination at all regions of a roughened face thereof while repetitively reproducing the roughened face.

Additional aspects and/or advantages of the present general inventive concept will be set forth in part in the description which follows and, in part, will be obvious from the description, or may be learned by practice of the invention.

The foregoing and/or other aspects of the general inventive concept is achieved by providing a light guide plate that may include an incidence face to allow light emitted from a light source to be incident on the light guide plate, an outgoing face to allow the incident light to exit the light guide plate, a backside face opposite to the outgoing face, and mirror patterns provided at the outgoing face or backside face, and adapted to increase an exiting rate of the light at a low luminance region defined in a vicinity of the light source.

In an aspect of the general inventive concept, the light guide plate may further include a prism face provided at the outgoing face or backside face. The mirror patterns may be formed at the prism face.

In another aspect of the general inventive concept, the mirror patterns may have a mean inclination that is reduced gradually as they extend away from the incidence face.

In another aspect of the general inventive concept, the mirror patterns may have a height that is reduced gradually as they extend away from the incidence face.

In still another aspect of the general inventive concept, the mirror patterns may have a pitch that increases gradually as they extend away from the incidence face.

In still another aspect of the general inventive concept, the light guide plate may have a tapered structure having a thickness that is reduced gradually as it extends away from the incidence face. The face opposite to the prism face may be roughened to have a uniform mean inclination at the entire portion thereof.

In another aspect of the general inventive concept, each mirror pattern may have a convex arc shape having a round surface or a polygonal surface, and has a mean inclination of 25° or less.

The foregoing and/or other aspects of the general inventive concept may also be achieved by providing a backlight unit that may include a light source, and a light guide plate including an incidence face to allow light emitted from a light source to be incident on the light guide plate, an outgoing face to allow the incident light to exit the light guide plate, a backside face opposite to the outgoing face, and mirror patterns provided at the outgoing face or backside face, and adapted to increase an exiting rate of the light at a low luminance region defined in a vicinity of the light source.

The foregoing and/or other aspects of the general inventive concept may also be achieved by providing a liquid crystal display that may include a liquid crystal panel, and a backlight unit adapted to irradiate illumination light onto the liquid crystal panel, the backlight unit may include a light source and a light guide plate including an incidence face to allow light emitted from a light source to be incident to the light guide plate, an outgoing face to allow the incident light to exit the light guide plate, a backside face opposite to the outgoing face, and mirror patterns provided at the outgoing face or backside face, and adapted to increase an exiting rate of the light at a low luminance region defined in a vicinity of the light source.

The foregoing and/or other aspects of the general inventive concept may also be achieved by providing a method of manufacturing a light guide plate. The method may include a mold machining operation including a prism face milling operation to form, at a mold, a prism face corresponding to a prism face of the light guide plate, and a mirror pattern milling operation to mill the prism face formed at the prism face milling operation using a bit having a predetermined cross-sectional shape, thereby forming mirror patterns at the prism face; and a light guide plate injection-molding operation to inject a molten resin into the mold completely machined at the mold machining operation, thereby injection-molding the light guide plate.

The mold machining operation may further include a roughening operation to roughen the mold to form, at the mold, a roughened face corresponding to a backside face of the light guide plate opposite to the prism face of the light guide plate.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
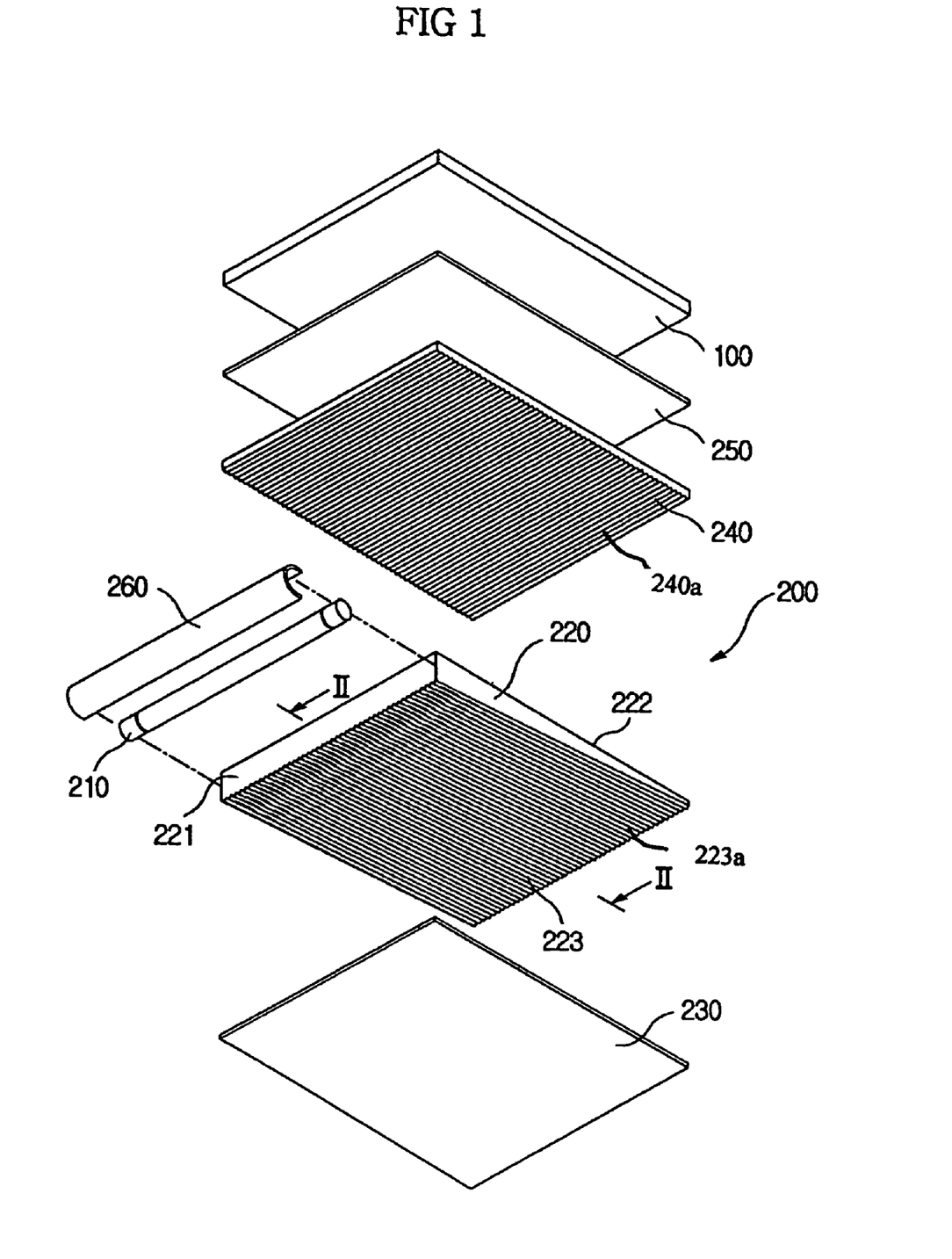
FIG. 1 is an exploded perspective view illustrating an LCD according to an embodiment of the present general inventive concept.

Referring to FIG. 1, an LCD according to an embodiment of the general inventive concept includes a liquid crystal panel 100, and a backlight unit 200 to irradiate illumination light onto a backside of the liquid crystal panel 100.

The backlight unit 200 may include a light source 210 to emit light, a light guide plate 220 to receive the light emitted from the light source 210, and to allow the light to exit an outgoing face 222 thereof toward the liquid crystal panel 100, a reflection sheet 230 arranged at a backside face 223 of the light guide plate 220 opposite to the outgoing face 222, a prism sheet 240, and a diffusion sheet 250. The prism sheet 240 and diffusion sheet 250 can be sequentially laminated over the outgoing face 222 of the light guide plate 220. The outgoing face 222 will be described hereinafter in detail.

The light source 210 may include a rod-shaped light source, such as a cold cathode tube. The light source 210 can be arranged at one side face of the light guide plate 220 such that it extends along the side surface. A reflector 260 having a semicircular cross-section can be arranged around the light source 210 to focus the light emitted from the light source 210, that is, illumination light, onto the light guide plate 220. The reflector 260 can be made of a sheet material capable of totally or diffusely reflecting the illumination light emitted from the light source 210 toward the light guide plate 220.

Figure 2:
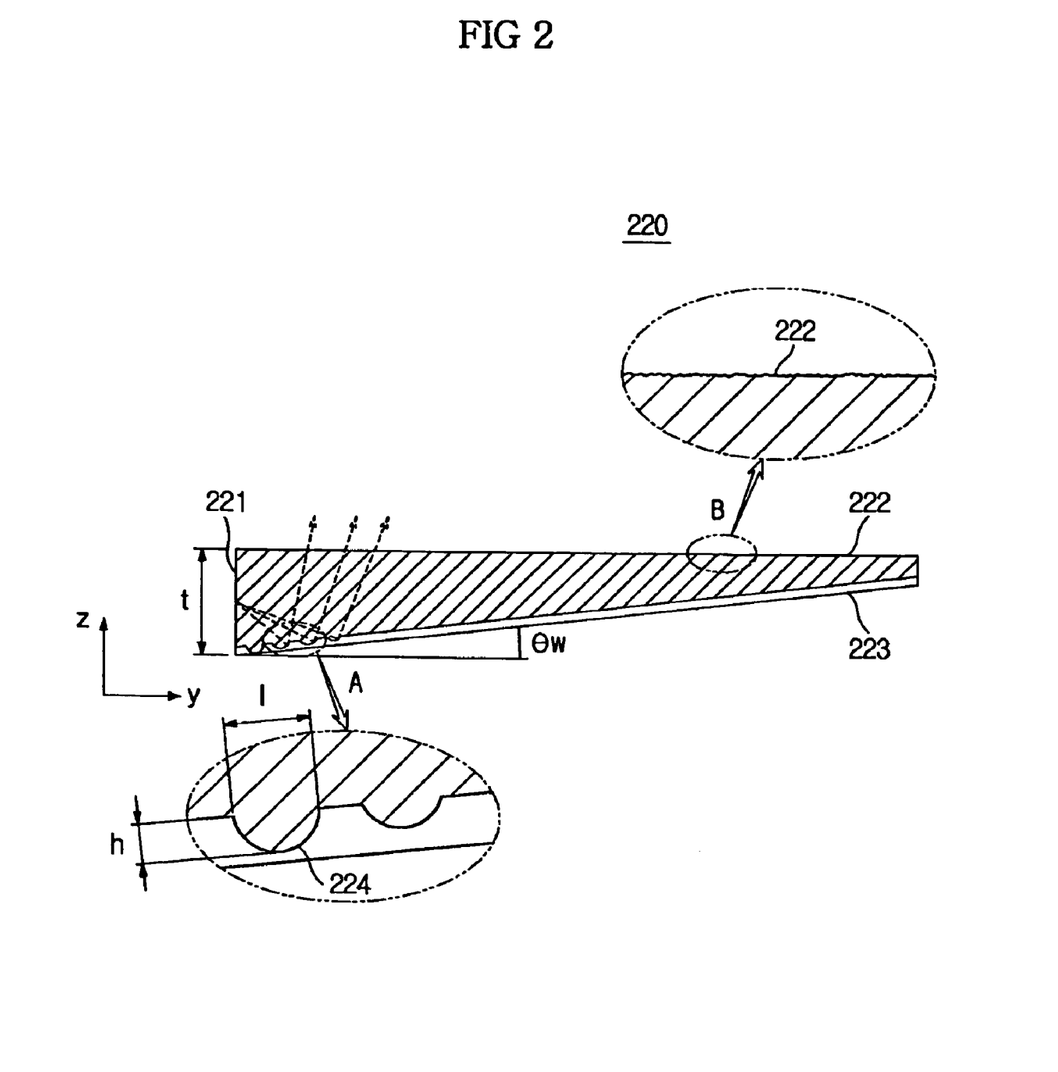
FIG. 2 is a cross-sectional view taken along the line II-II in FIG. 1, illustrating a light guide plate included in the LCD of FIG. 1.

The light guide plate 220 may include an injection-molded body made of a transparent resin, such as polymethyl methacrylate (PMMA), while having two major faces and four minor faces. As shown in FIG. 2, the light guide plate 220 may have a tapered cross section having a thickness that is reduced gradually as it extends away from the light source 210. The minor face of the light guide plate 220 arranged toward the light source 210, that is, the minor face corresponding to a thickest portion of the tapered cross section, corresponds to the incidence face 221, to which the illumination light is incident. One of the major surfaces of the light guide plate 220 corresponds to the outgoing face 222 from which the illumination light exits, whereas the other major surface corresponds to the backside face 223 opposite to the outgoing face 222.

The backside face 223 can have a prism face 223a provided with a series of linear protrusions each having a triangular cross section. The linear protrusions of the backside face 223a may extend in a direction orthogonal to the incidence face 221. The prism face may also be provided with mirror patterns 224 in order to promote exiting of light in the vicinity of the incidence face 221. Each mirror pattern 224 can have a smooth mirror face at its surface, as shown in an enlarged portion A of FIG. 2. The outgoing face 222 can be roughened at the entire portion thereof so that it has a uniform mean inclination at the entire portion thereof, in order to achieve an enhancement in the exiting rate of the illumination light at the entire portion thereof, as shown in an enlarged portion B of FIG. 2. The mirror patterns 224 will again be described in detail hereinafter.

The reflection sheet 230 reflects illumination light leaking from the backside face 223 of the light guide plate 220 to return the leaking illumination light into the light guide plate 220. Thus, the reflection sheet 230 can function to prevent loss of light. Generally, the reflection sheet 230 may include a sheet-shaped specular reflection member made of a metal foil or a diffuse reflection member made of a white polyethylene telephthalate (PET) film.

The prism sheet 240 may have, at a lower surface thereof, a prism face 240a with a series of linear protrusions each having a triangular cross section. The linear protrusions of the prism sheet 240 may extend in a direction parallel to the incidence face 221. The prism sheet 240 can be made of a transparent sheet material such as polycarbonate.

The light from the light source 210 incident to the light guide plate 220 exits the outgoing face 222 of the light guide plate 220 after being propagated along the interior of the light guide plate 220. The outgoing light has a direction not normal to the outgoing face 222, but inclined from the normal direction toward a direction opposite to the light source 210. This direction of the outgoing light can be corrected by the prism faces 223a and 240a respectively provided at the backside face 223 and the prism sheet 240 such that the outgoing light can be directed in the direction normal to the outgoing face 222.

The diffusion sheet 250 may include a sheet-shaped member having a weak light scattering property. The diffusion sheet 250 can function to scatter the illumination light exiting the prism sheet 240, thereby relaxing the direction of the outgoing light.

Now, the mirror patterns 224 provided at the backside face 223 will be described in detail.

The mirror patterns 224 can serve to increase the mean inclination of the backside face 223, thereby causing the light exiting the outgoing face 222 to have a large amount of components having an exiting angle smaller than a critical total-reflection angle, as indicated by arrows in FIG. 2. Thus, the mirror patterns 224 increase the amount of outgoing light. This principle is similar to conventional techniques, but the general inventive concept here is characterized in that it not only uses the roughened face of the outgoing face 222, but also uses the mirror patterns 224 each having a smooth surface. Accordingly, it is possible to avoid a haze phenomenon of light exiting the mirror patterns 224, thereby achieving an improvement in light efficiency.

The mirror patterns 224 can each convexly protrude in the form of an arc from a valley defined between adjacent ones of the linear protrusions provided at the backside face 222 of the light guide plate 220. The mirror patterns 224 can extend parallel to the incidence face 221 of the light guide plate 220 in the form of a plurality of parallel lines, respectively. The mirror patterns 224 can have a small size in that the mean length thereof is about 50 µm, so that they are essentially invisible to the naked eye.

Figure 3:
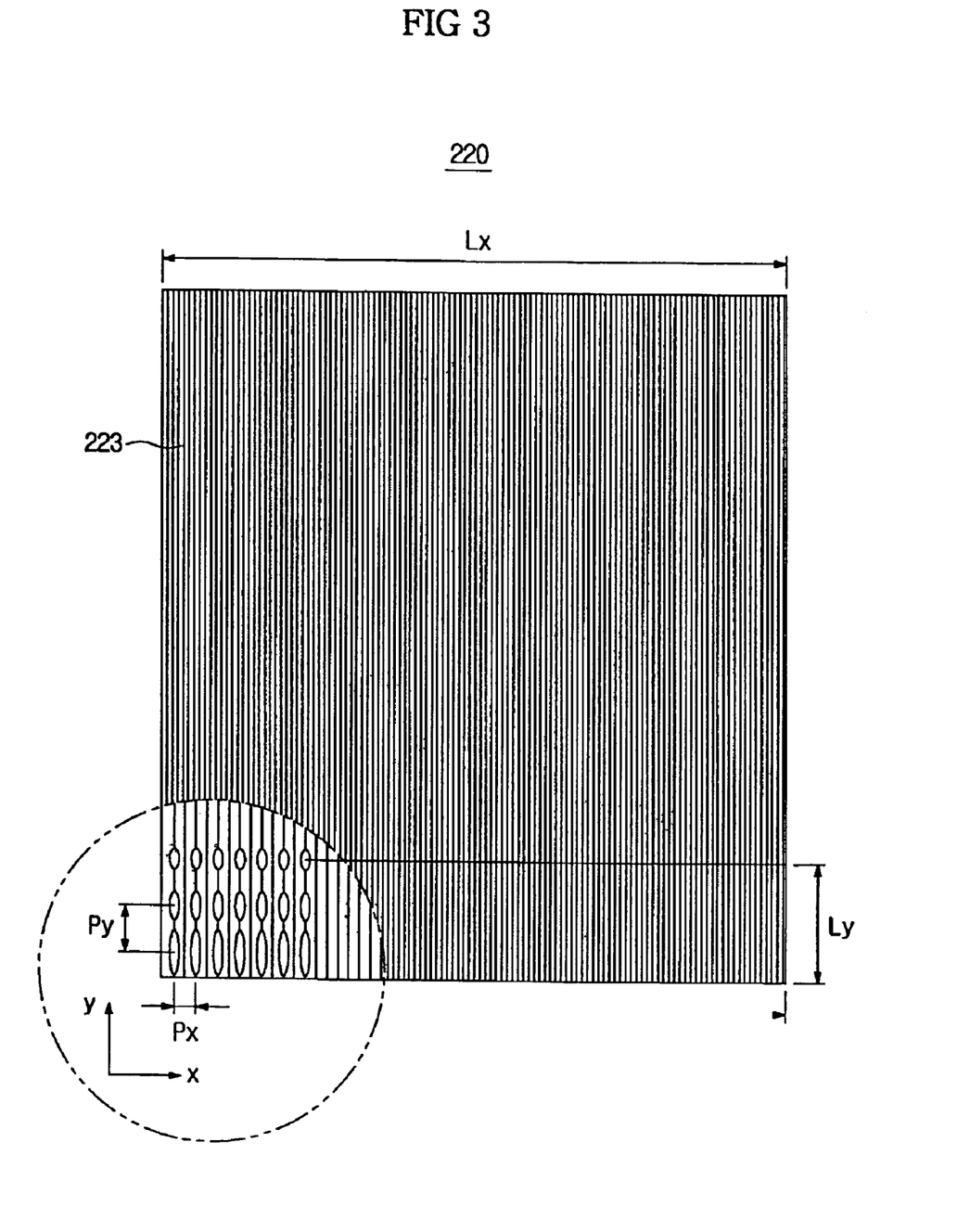
FIG. 3 is a plan view illustrating the light guide plate shown in FIG. 1.

Referring to FIGS. 2 and 3, it can be assumed that an x axis represents a longitudinal direction of the incidence face 221, a y axis represents a normal direction of the incident face 221, and a z axis represents the thickness direction of the light guide plate 220. It can also be assumed that "Px" represents a pitch of the mirror patterns 224 in the x-axis direction, "Py" represents a pitch of the mirror patterns 224 in the y-axis direction, "t" represents the thickness of the light guide plate 220 at the incidence face 221 in the z-axis direction, and "Θw" represents an inclination of the backside face 223 with respect to a horizontal plane.

Under this assumption, the x-axis extension range of the mirror patterns 224, Lx, can be expressed by "Lx=ΣPx", and the y-axis extension range of the mirror patterns 224, Ly, can be expressed by "Ly =ΣPy". Here, "Lx" is determined by a corresponding x-axis length of the light guide plate 220. On the other hand, "Ly" is determined by the thickness t of the light guide plate 220 at the incidence face 221, and the inclination Θw of the backside face 223 with respect to the horizontal plane. It is as aspect that "Ly" corresponds to 50 times or less of the thickness t.

The mean inclination of the mirror patterns 224, Θp, is expressed by the following Expression A:

$$\Theta p = \arctan\{2h/l\} \qquad \text{Expression A}$$

where, "l" represents the length of each mirror pattern 224, and "h" represents the height of each mirror pattern 224.

Where it is assumed that the mirror patterns 224, which have an arc-shaped cross section, have a radius of curvature R, the mean inclination of the mirror patterns 224, Θp, corresponds to "$\Theta p = \arctan\{1/(R/h-1)^{1/2}\}$". Where it is also assumed that the outgoing face 222 is uniformly roughened to have a mean inclination Θm, in order to promote outgoing of light, the mean inclination of a low luminance region of the outgoing face 222, Θa, corresponds to the sum of Θm and Θp. In order to avoid an excessive increase in the outgoing rate of light, it is preferred that the mean inclination Θp of the mirror patterns 224 be equal to or less than about 25°.

Meanwhile, the low luminance region exhibits a tendency to gradually increase in luminance as it extends away from the incidence face 221. Taking into account such a tendency, the backside face 223 should have a mean inclination that is reduced gradually as it extends away from the incidence face 221. As parameters associated with the mean inclination of the backside face 223, there are the radius of curvature R, height h, x-axis pitch Px, and y-axis axis pitch Py of the mirror patterns 224. The mean inclination of the backside face 223 at an optional region thereof is determined to correspond to the luminance tendency of the low luminance region. Accordingly, the above parameters are controlled to satisfy the determined mean inclination of the backside face 223.

Figure 4:
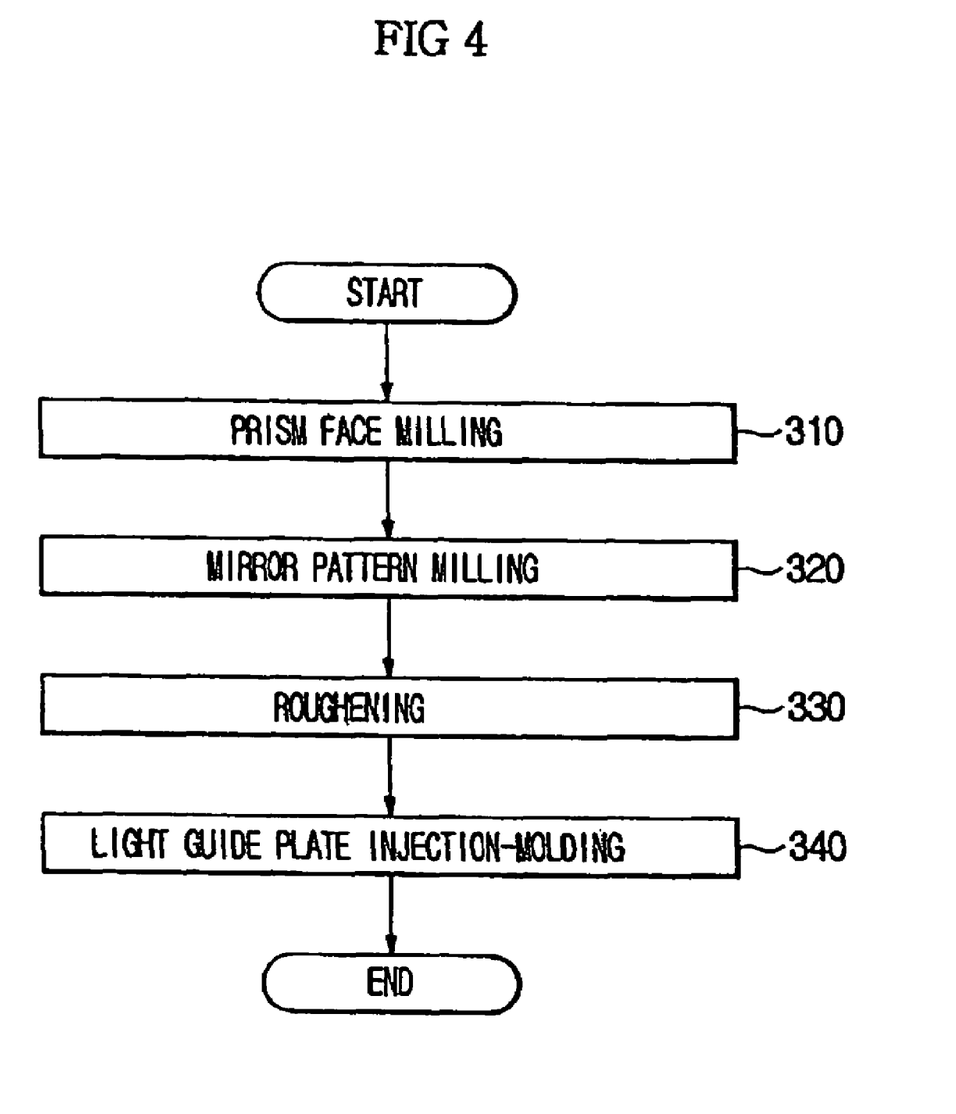
FIG. 4 is a flow chart illustrating a method of manufacturing the light guide plate in FIG. 1.

A method of manufacturing the light guide plate 220 according to the present general inventive concept may be similar to conventional methods in which a light guide plate is manufactured by injection-molding a resin, such as polymethyl methacrylate (PMMA), except for the manufacture of a mold used with the injection molding process. That is, the light guide plate manufacturing method of the present general inventive concept is characterized in that a prism face is formed at the mold in accordance with a milling process, and is then milled to a desired depth using a bit having a particular cross-sectional shape to form the mirror patterns 224. As shown in FIG. 4, this light guide plate manufacturing method includes: a mold machining operation including a prism face milling operation 310 to form, at a mold adapted to injection-mold a light guide plate, a prism face corresponding to an outgoing face of the light guide plate, a mirror pattern milling operation 320 to mill the prism face to form mirror patterns at the prism face, and a roughening operation 330 to roughen the mold to form, at the mold, a roughened face corresponding to a backside face of the light guide plate opposite to the outgoing face; and a light guide plate injection-molding operation 340 to inject a resin such as PMMA into the mold completely machined by the mold machining operation, thereby injection-molding the light guide plate.

Figure 5:
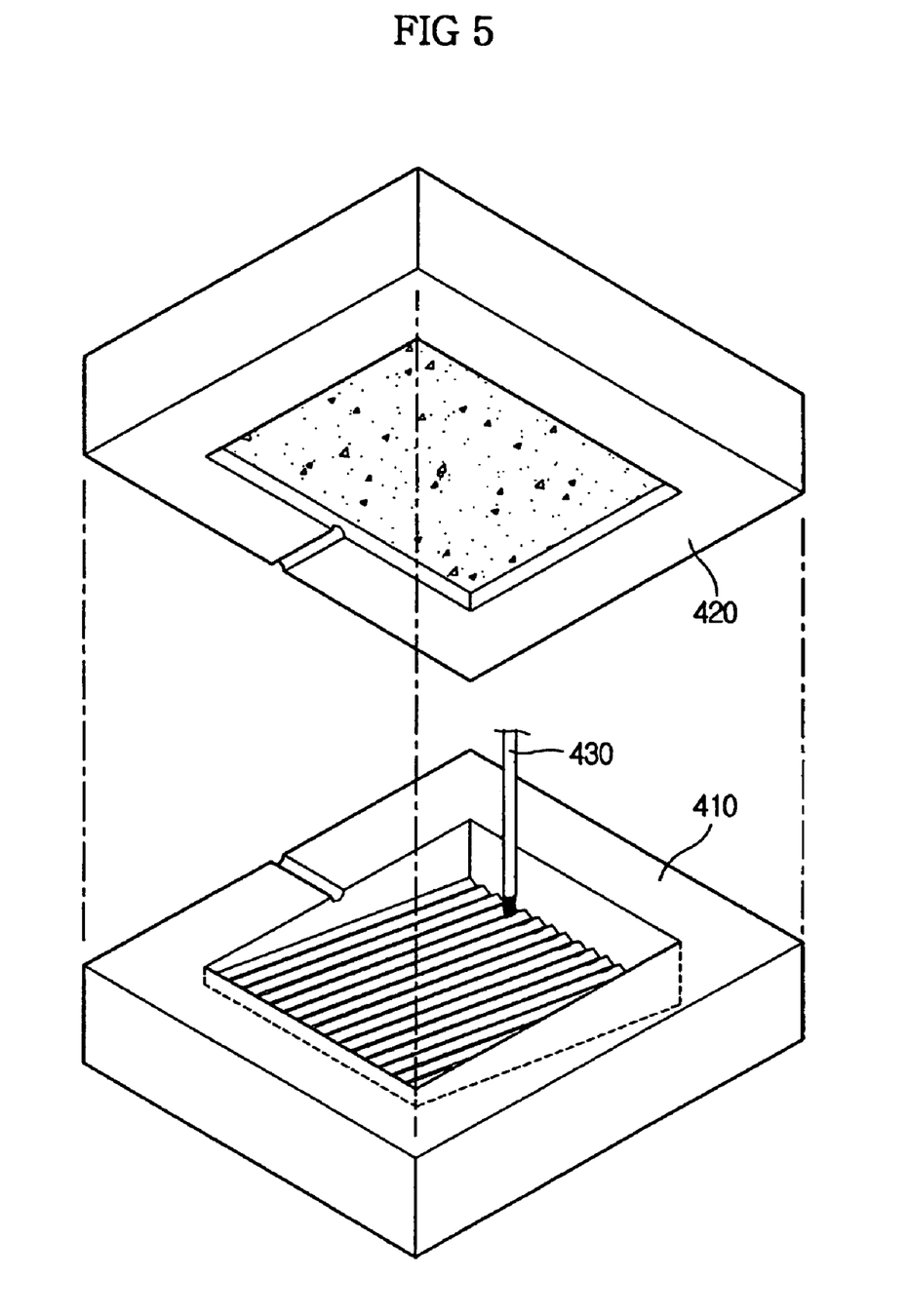
FIG. 5 is a perspective view illustrating a mold to manufacture the light guide plate in FIG. 1.

As shown in FIG. 5, the mold used to injection-mold the light guide plate includes first and second molds 410 and 420. At the prism face milling operation 310, the first mold 410 is milled to form a prism face corresponding to the prism face provided at the backside face 223 of the light guide plate 220. The prism face of the first mold 410 has a structure provided with a series of linear protrusions each having a triangular cross section. In order to form mirror patterns corresponding to the mirror patterns 224 at the prism face of the first mold 410, the prism face of the first mold 410 can be milled to a desired depth in a direction orthogonal to the linear protrusions using a bit 430 having an arc-shaped cross section, at the mirror pattern milling operation 320. At the roughening operation 330, the second mold 420 can be roughened in accordance with an etching or blasting process to have a desired uniform mean inclination at a face thereof corresponding to the backside face 223 of the light guide plate 220. At the light guide plate injection-molding operation 340, a resin, such as PMMA, can be injected into the mold completely machined by the above operations. Thus, the light guide plate 220 is injection-molded.

Parameters to control the mean inclination of the backside face 223 can be controlled at the mirror pattern milling operation 320. Here, the radius of curvature R of the mirror patterns 224 is determined by the shape of the bit 430. Also, the x-axis pitch Px of the mirror patterns 224 is determined by the space between adjacent ones of the linear protrusions at the prism face. In this regard, the height h of the mirror patterns 224, that is, the milled depth of the first mold 410, and the y-axis pitch Py of the mirror patterns 224 serve as main parameters. In order to gradually reduce the mean inclination of the outgoing face 222 in a direction away from the incidence face 221, it is an aspect of the general inventive concept to gradually reduce the height h (or the milled depth) in the same direction under the condition in which the y-axis pitch Py is constant, or to gradually increase the y-axis pitch Py in the same direction under the condition in which the height h is constant.

Since the mean inclination of the mirror pattern 224 provided at the light guide plate 220 in accordance with the general inventive concept can be controlled by the above described parameters at the operation of milling the mold 410 by use of the bit 430, it is possible to implement an accurate mean inclination, as compared to conventional cases using non-uniform scattering patterns. If a plurality of molds are milled under the same conditions as described in the present general inventive concept, the same mirror patterns are then formed at those molds, respectively. Thus, repetitive reproduction of the mirror patterns 224 can be achieved.

The above description is associated with an embodiment of the general inventive concept. The following description is directed to another embodiment of the general inventive concept.

Figure 6:
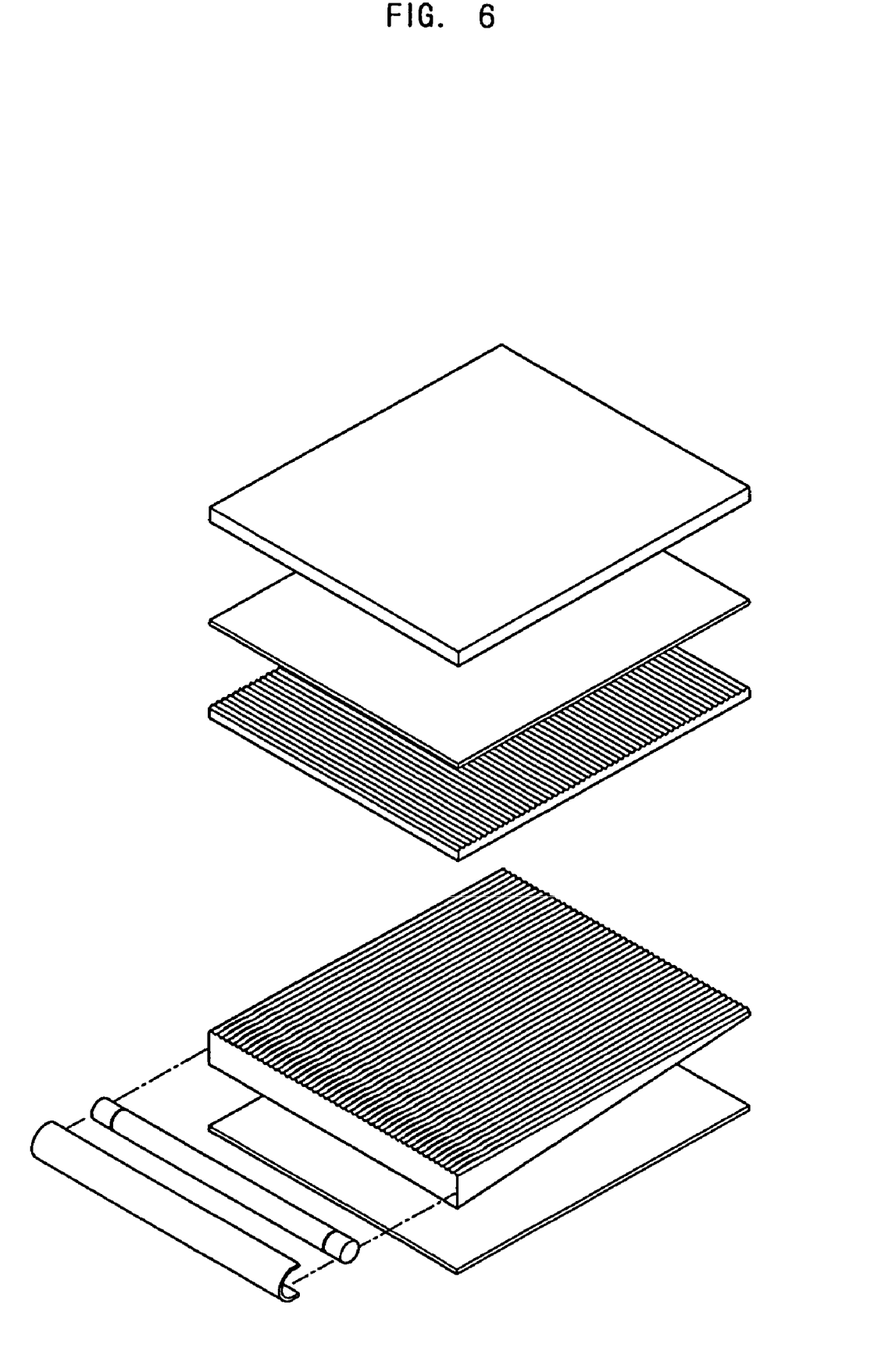
FIG. 6 is an exploded perspective view illustrating an LCD according to another embodiment of the present general inventive concept.

Although the light guide plate according to the above described embodiment of the general inventive concept has the prism face at the backside face thereof, such a prism face may also be provided at the outgoing face of the light guide plate. For example, FIG. 6 illustrates an embodiment of the general inventive concept wherein the light guide plate has mirror patterns formed on the outgoing face 222.

The mirror patterns are described in the above described embodiment as being formed at the same face as the prism face since the prism face milling process and the mirror pattern milling process can be carried out at the same face of the mold, thereby easily achieving the manufacture of the mold. However, such mirror patterns may be formed at the face opposite to the prism face because an aspect of the general inventive concept is to enhance the efficiency of outgoing light by the mirror patterns other than roughened scattering patterns. Although the mirror patterns above have been described as having an arc-shaped cross section having a round surface, they may have an arc-shaped cross section having a polygonal surface, for example, a triangular or rectangular surface. The cross-sectional shape of the mirror patterns can be determined by the shape of the bit adapted to mill the mold. Thus, the mirror patterns may have an optional cross-sectional shape, as long as they have a desired mean inclination at an optional region thereof.

As apparent from the above description, the light guide plate according to the general inventive concept has the mirror patterns each having a smooth surface, so that it can eliminate a haze phenomenon of outgoing light while obtaining a desired uniformity of luminance, thereby achieving an enhancement in light efficiency. Where a backlight unit using the light guide plate, and an LCD using the backlight unit are manufactured in accordance with the general inventive concept, they have superior effects, as compared to conventional backlight units and LCDs. In accordance with the light guide plate manufacturing method according to the general inventive concept, there are effects capable of implementing and repetitively reproducing an accurate mean inclination of the mirror patterns formed at the light guide plate.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:
1. A light guide plate comprising:
an incidence face to allow light emitted from a light source to be incident to the light guide plate;
an outgoing face to allow the incident light to exit the light guide plate;
a backside face opposite to the outgoing face; and
concave mirror patterns provided at the outgoing face or backside face and adapted to increase an exiting rate of the light at a low luminance region defined in a vicinity of the light source and having a mean inclination that is reduced gradually as the concave mirror patterns extend away from the incidence face.

2. The light guide plate according to claim 1, further comprising:
a prism face provided at the outgoing face or backside face, wherein the mirror patterns are formed at the prism face.

3. The light guide plate according to claim 2, wherein the mirror patterns have a height that is reduced gradually as they extend away from the incidence face.

4. The light guide plate according to claim 2, wherein the mirror patterns have a pitch that increases gradually as they extend away from the incidence face.

5. The light guide plate according to claim 2, wherein:
the light guide plate has a tapered structure having a thickness that is reduced gradually as it extends away from the incidence face, and
the face opposite to the prism face is roughened to have a uniform mean inclination at the entire portion thereof.

6. The light guide plate according to claim 2, wherein each of the mirror patterns has a convex arc shape having a round surface or a polygonal surface and has a mean inclination of 25° or less.

7. A backlight unit comprising:
a light source; and
a light guide plate including an incidence face to allow light emitted from a light source to be incident to the light guide plate, an outgoing face to allow the incident light to exit the light guide plate, a backside face opposite to the outgoing face, and concave mirror patterns provided at the outgoing face or backside face and adapted to increase an exiting rate of the light at a low luminance region defined in a vicinity of the light source and having a mean inclination that is reduced gradually as the concave mirror patterns extend away from the incidence face.

8. The backlight unit according to claim 7, wherein the light guide plate further includes a prism face provided at the outgoing face or backside face, and the mirror patterns are formed at the prism face.

9. The backlight unit according to claim 8, wherein the mirror patterns have a height that is reduced gradually as they extend away from the incidence face.

10. The backlight unit according to claim 8, wherein the mirror patterns have a pitch that increases gradually as they extend away from the incidence face.

11. The light guide plate according to claim 8, wherein:
the light guide plate has a tapered structure having a thickness that is reduced gradually as it extends away from the incidence face, and
the face opposite to the prism face is roughened to have a uniform mean inclination at the entire portion thereof.

12. The backlight unit according to claim 8, wherein each of the mirror patterns has a convex arc shape having a round surface or a polygonal surface and has a mean inclination of 25° or less.

13. A liquid crystal display comprising:
a liquid crystal panel; and
a backlight unit adapted to irradiate illumination light onto the liquid crystal panel, the backlight unit including:
a light source; and
a light guide plate including an incidence face to allow light emitted from a light source to be incident to the light guide plate, an outgoing face to allow the incident light to exit the light guide plate, a backside face opposite to the outgoing face, and concave mirror patterns provided at the outgoing face or backside face and adapted to increase an exiting rate of the light at a low luminance region defined in a vicinity of the light source and having a mean inclination that is reduced gradually as the concave mirror patterns extend away from the incidence face.

14. The liquid crystal display according to claim 13, wherein the light guide plate further includes a prism face provided at the outgoing face or backside face, and the mirror patterns are formed at the prism face.

15. The liquid crystal display according to claim 14, wherein the mirror patterns have a height that is reduced gradually as they extend away from the incidence face.

16. The liquid crystal display according to claim 14, wherein the mirror patterns have a pitch that increases gradually as they extend away from the incidence face.

17. The light guide plate according to claim 14, wherein:
the light guide plate has a tapered structure having a thickness that is reduced gradually as it extends away from the incidence face, and
the face opposite to the prism face is roughened to have a uniform mean inclination at the entire portion thereof.

18. The liquid crystal display according to claim 14, wherein each of the mirror patterns has a convex arc shape having a round surface or a polygonal surface and has a mean inclination of 25° or less.

19. A method of manufacturing a light guide plate, comprising:
a mold machining operation including a prism face milling operation to form, at a mold, a prism face corresponding to a prism face of the light guide plate, and a mirror pattern milling operation to mill the prism face formed at the prism face milling operation using a bit having a predetermined cross-sectional shape to form mirror patterns at the prism face; and
a light guide plate injection-molding operation to inject a molten resin into the mold machined at the mold machining operation to injection-mold the light guide plate.

20. The method according to claim 19, wherein the mold machining operation further includes a roughening operation to roughen the mold to form, at the mold, a roughened face corresponding to a backside face of the light guide plate opposite to the prism face of the light guide plate.

21. A backlight unit to irradiate illumination light onto the backside of an LCD panel, the backlight unit comprising:
a light source to emit light; and
a light guide plate including:
an incidence face to receive the emitted tight,
an outgoing face to allow the light to exit toward the LCD panel, and
a backside face opposite to the outgoing face and having mirror patterns thereon to increase an exiting rate of the emitted light in a low luminance region of the outgoing face;
a reflection sheet arranged at the backside face of the light guide plate;
a prism sheet laminated on the outgoing face; and
a diffusion sheet laminated on the prism sheet.

22. The backlight unit of claim 21, wherein the mirror patterns linearly protrude from the backside face, each mirror pattern forming an arc from a valley defined between adjacent ones of the linear protrusions.

23. The backlight unit of claim 22, wherein the mirror patterns extend in parallel with the incidence face of the light guide plate.

24. The backlight unit of claim 23, wherein the mirror patterns each have a mean length of about 50 μm.

25. A liquid crystal display (LCD) comprising:
an LCD panel; and
a backlight unit to irradiate illumination light onto the backside of the LCD panel, the backlight unit comprising;
a light source to emit light,
a light guide plate having an incidence face to receive the emitted light, an outgoing face to allow the light to exit toward the LCD panel, and a backside face opposite to the outgoing face and having mirror patterns to increase the light exiting the outgoing face in a predetermined region thereof,
a reflection sheet arranged at the backside face of the light guide plate,
a prism sheet laminated on the outgoing face of the light guide plate, and
a diffusion sheet laminated on an side of the prism sheet opposite to the light guide plate.

26. A method of manufacturing a light guide plate, comprising:
injection-molding body made of a transparent resin having two major faces and four
minor faces forming a light guide plate with a tapered cross section;
performing a first milling operation on one surface of the light guide plate to form a prism face thereon; and
performing a second milling operation on the prism face using a bit having a predetermined cross-sectional shape to form mirror patterns on the prism face.

27. A light guide plate to receive light from a light source and to output the light, comprising:
an incident face to receive the light;
an outgoing face disposed in a direction substantially perpendicular to the incident face to output the light;
a backside face disposed in a direction having an angle with respect to the outgoing face; and
a mirror pattern formed on the outgoing face or the backside face and having a convex shape protruding from the outgoing face or the backside face.

28. A light guide unit to receive light from a light source and to output the light, comprising:
a light guide plate, comprising:
an incident face to receive the light,
an outgoing face to emit the light, and
a backside face disposed in a direction having an angle with respect to the outgoing face, and
a plurality of mirrors having a smooth surface provided on the backside face or outgoing face to reflect the light near the light source to have an exiting angle smaller than a critical total-reflection angle.

29. The light guide plate of claim 28, further comprising a reflective material formed on the backside face.

30. The light guide plate of claim 28, wherein the mirror pattern portions extend from the incident face for a length that is fifty times or less a thickness of the light guide plate.

31. The light guide plate of claim 28, further comprising a roughened surface on the outgoing face.

* * * * *